US011942024B2

(12) United States Patent
(10) Patent No.: US 11,942,024 B2
(45) Date of Patent: Mar. 26, 2024

Lee et al.

(54) DISPLAY DEVICE INCLUDING CELL MATRIX INCLUDING REDUNDANCY CELL

(71) Applicant: SAMSUNG ELECTRONICS CO., LTD., Suwon-si (KR)

(72) Inventors: Yilho Lee, Seoul (KR); Yongil Kwon, Suwon-si (KR); Sugyeung Kang, Suwon-si (KR); Taehyeon Kwon, Seoul (KR); Kangjoo Kim, Hwaseong-si (KR); Sunkwon Kim, Hwaseong-si (KR); Hyunsang Park, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/748,380

(22) Filed: May 19, 2022

(65) Prior Publication Data

US 2022/0406246 A1 Dec. 22, 2022

(30) Foreign Application Priority Data

Jun. 18, 2021 (KR) ........................ 10-2021-0079519

(51) Int. Cl.

*G09G 3/32* (2016.01)
*G09G 3/00* (2006.01)

(Continued)

(52) U.S. Cl.

CPC ............... *G09G 3/32* (2013.01); *G09G 3/035* (2020.08); *G09G 3/2088* (2013.01); *G09G 3/28* (2013.01); *G09G 3/30* (2013.01); *G09G 3/3208* (2013.01); *G09G 3/3611* (2013.01); *G09G 2300/0857* (2013.01); *G09G 2310/0286* (2013.01); *G09G 2310/0289* (2013.01);

(Continued)

(58) Field of Classification Search

CPC .................. G09G 3/32; G09G 3/2088; G09G 2300/0857; G09G 2310/0286; G09G 2310/0289; G09G 2310/0297; G09G 2310/08; G09G 2330/08; G09G 3/3611; G09G 3/035; G09G 3/28; G09G 3/30; G09G 3/3208

See application file for complete search history.

(56) References Cited

U.S. PATENT DOCUMENTS 6,372,608 B1 4/2002 Shimoda et al.
6,645,830 B2 11/2003 Shimoda et al.

(Continued)

FOREIGN PATENT DOCUMENTS

KR 10-2131264 B1 7/2020

*Primary Examiner* — Adam J Snyder
(74) *Attorney, Agent, or Firm* — Fish & Richardson P.C.

(57) ABSTRACT

A display device includes: a cell matrix including a first cell line and a second cell line, wherein the first cell line includes first cells sharing first row lines, and the second cell line includes second cells sharing second row lines; a redundancy integrated circuit including a redundancy cell line including redundancy cells, wherein the redundancy cells share a third row line and are connected to the first and second cells through a plurality of column lines and a plurality of connection lines; and a display driver integrated circuit (DDI) configured to replace the first cell line or the second cell line with the redundancy cell line through the first row lines, the second row lines, and the third row line based on whether the first and second cell lines include a bad cell.

20 Claims, 18 Drawing Sheets

(51) Int. Cl.
*G09G 3/20* (2006.01)
*G09G 3/28* (2013.01)
*G09G 3/30* (2006.01)
*G09G 3/3208* (2016.01)
*G09G 3/36* (2006.01)

(52) U.S. Cl.
CPC . *G09G 2310/0297* (2013.01); *G09G 2310/08* (2013.01); *G09G 2330/08* (2013.01)

(56) References Cited

U.S. PATENT DOCUMENTS

| | | | | |
|---|---|---|---|---|
| RE38,466 | E | 3/2004 | Inoue et al. | |
| 6,818,465 | B2 | 11/2004 | Biwa et al. | |
| 6,818,530 | B2 | 11/2004 | Shimoda et al. | |
| 6,858,081 | B2 | 2/2005 | Biwa et al. | |
| 6,967,353 | B2 | 11/2005 | Suzuki et al. | |
| 7,002,182 | B2 | 2/2006 | Okuyama et al. | |
| 7,084,420 | B2 | 8/2006 | Kim et al. | |
| 7,087,932 | B2 | 8/2006 | Okuyama et al. | |
| 7,154,124 | B2 | 12/2006 | Han et al. | |
| 7,208,725 | B2 | 4/2007 | Sherrer et al. | |
| 7,288,758 | B2 | 10/2007 | Sherrer et al. | |
| 7,319,044 | B2 | 1/2008 | Han et al. | |
| 7,501,656 | B2 | 3/2009 | Han et al. | |
| 7,709,857 | B2 | 5/2010 | Kim et al. | |
| 7,759,140 | B2 | 7/2010 | Lee et al. | |
| 7,781,727 | B2 | 8/2010 | Sherrer et al. | |
| 7,790,482 | B2 | 9/2010 | Han et al. | |
| 7,911,432 | B2 | 3/2011 | Kenney et al. | |
| 7,940,350 | B2 | 5/2011 | Jeong | |
| 7,959,312 | B2 | 6/2011 | Yoo et al. | |
| 7,964,881 | B2 | 6/2011 | Choi et al. | |
| 7,985,976 | B2 | 7/2011 | Choi et al. | |
| 7,994,525 | B2 | 8/2011 | Lee et al. | |
| 8,008,683 | B2 | 8/2011 | Choi et al. | |
| 8,013,352 | B2 | 9/2011 | Lee et al. | |
| 8,013,876 | B2 | 9/2011 | Chung et al. | |
| 8,049,161 | B2 | 11/2011 | Sherrer et al. | |
| 8,129,711 | B2 | 3/2012 | Kang et al. | |
| 8,179,938 | B2 | 5/2012 | Kim | |
| 8,263,987 | B2 | 9/2012 | Choi et al. | |
| 8,324,646 | B2 | 12/2012 | Lee et al. | |
| 8,399,944 | B2 | 3/2013 | Kwak et al. | |
| 8,432,511 | B2 | 4/2013 | Jeong | |
| 8,459,832 | B2 | 6/2013 | Kim | |
| 8,502,242 | B2 | 8/2013 | Kim | |
| 8,536,604 | B2 | 9/2013 | Kwak et al. | |
| 8,735,931 | B2 | 5/2014 | Han et al. | |
| 8,766,295 | B2 | 7/2014 | Kim | |
| 9,153,171 | B2 * | 10/2015 | Sakariya | G09G 3/3233 |
| 9,159,258 | B2 | 10/2015 | Lee | |
| 9,468,050 | B1 | 10/2016 | Rotzoll et al. | |
| 10,152,917 | B2 | 12/2018 | Chung | |
| 2015/0109189 | A1 * | 4/2015 | Hwang | G09G 3/3233 345/78 |
| 2015/0138171 | A1 * | 5/2015 | Kim | G09G 3/3233 345/82 |
| 2015/0339998 | A1 * | 11/2015 | Yen | G09G 3/32 345/100 |
| 2016/0078811 | A1 * | 3/2016 | Park | G09G 3/3233 345/78 |
| 2017/0187976 | A1 * | 6/2017 | Cok | G09G 3/3208 |
| 2017/0330509 | A1 * | 11/2017 | Cok | G09G 3/3225 |
| 2018/0211582 | A1 * | 7/2018 | Sakariya | G09G 3/32 |
| 2018/0323180 | A1 * | 11/2018 | Cok | G09G 3/32 |
| 2021/0005133 | A1 | 1/2021 | Park | |

* cited by examiner

DISPLAY DEVICE INCLUDING CELL MATRIX INCLUDING REDUNDANCY CELL

CROSS-REFERENCE TO RELATED APPLICATION

This application is based on and claims priority under 35 U.S.C. § 119 to Korean Patent Application No. 10-2021-0079519, filed on Jun. 18, 2021, in the Korean Intellectual Property Office, the disclosure of which is incorporated by reference herein in its entirety.

BACKGROUND

1. Field

Embodiments relate to a display device, and more particularly, to a display device including a cell matrix.

2. Description of the Related Art

As the information-oriented society develops, the demand for display devices that display images is increasing, and various types of display devices, such as liquid crystal display devices, plasma display devices, organic light emitting display devices, or the like, have been used.

SUMMARY

According to an embodiment, there is provided a display device including: a cell matrix including a first cell line and a second cell line, wherein the first cell line includes first cells sharing first row lines, and the second cell line includes second cells sharing second row lines; a redundancy integrated circuit including a redundancy cell line including redundancy cells, wherein the redundancy cells share a third row line and are connected to the first and second cells through a plurality of column lines and a plurality of connection lines; and a display driver integrated circuit (DDI) configured to replace the first cell line or the second cell line with the redundancy cell line through the first row lines, the second row lines, and the third row line based on whether the first and second cell lines include a bad cell.

According to another embodiment, there is provided a display device including: a cell matrix including first cells configured to share first row lines, first memory elements respectively corresponding to the first cells, second cells configured to share second row lines, and second memory elements respectively corresponding to the second cells; and a redundancy integrated circuit including redundancy cells, wherein the redundancy cells are configured to share a third row line and are connected to the first and second cells through a plurality of column lines and a plurality of connection lines, wherein each of the first cells is configured to be selectively replaced with one of the redundancy cells, the one redundancy cell being connected to the first cell, based on a value stored in one of the first memory elements, the one first memory element being connected to the first cell, and each of the second cells is configured to be selectively replaced with one of the redundancy cells, the one redundancy cell being connected to the second cell, based on a value stored in one of the second memory elements, the one second memory element being connected to the second cell.

According to another embodiment, there is provided a display device including: a cell matrix including a first cell; and a redundancy integrated circuit including a first redundancy cell connected to the first cell through a first connection line, wherein the first redundancy cell includes a first shifter configured to store and output first data, and the first cell includes: a second shifter configured to store and output second data; a first multiplexer configured to select and output one of the first data received from the first shifter through the first connection line and the second data based on a first replacement selection signal; a logic gate configured to output an output signal of the first multiplexer based on an output enable signal; and a light emitting element configured to emit light in response to the output signal of the first multiplexer received from the logic gate.

BRIEF DESCRIPTION OF THE DRAWINGS

Features will become apparent to those of skill in the art by describing in detail example embodiments with reference to the attached drawings in which.

DETAILED DESCRIPTION

Figure 1:
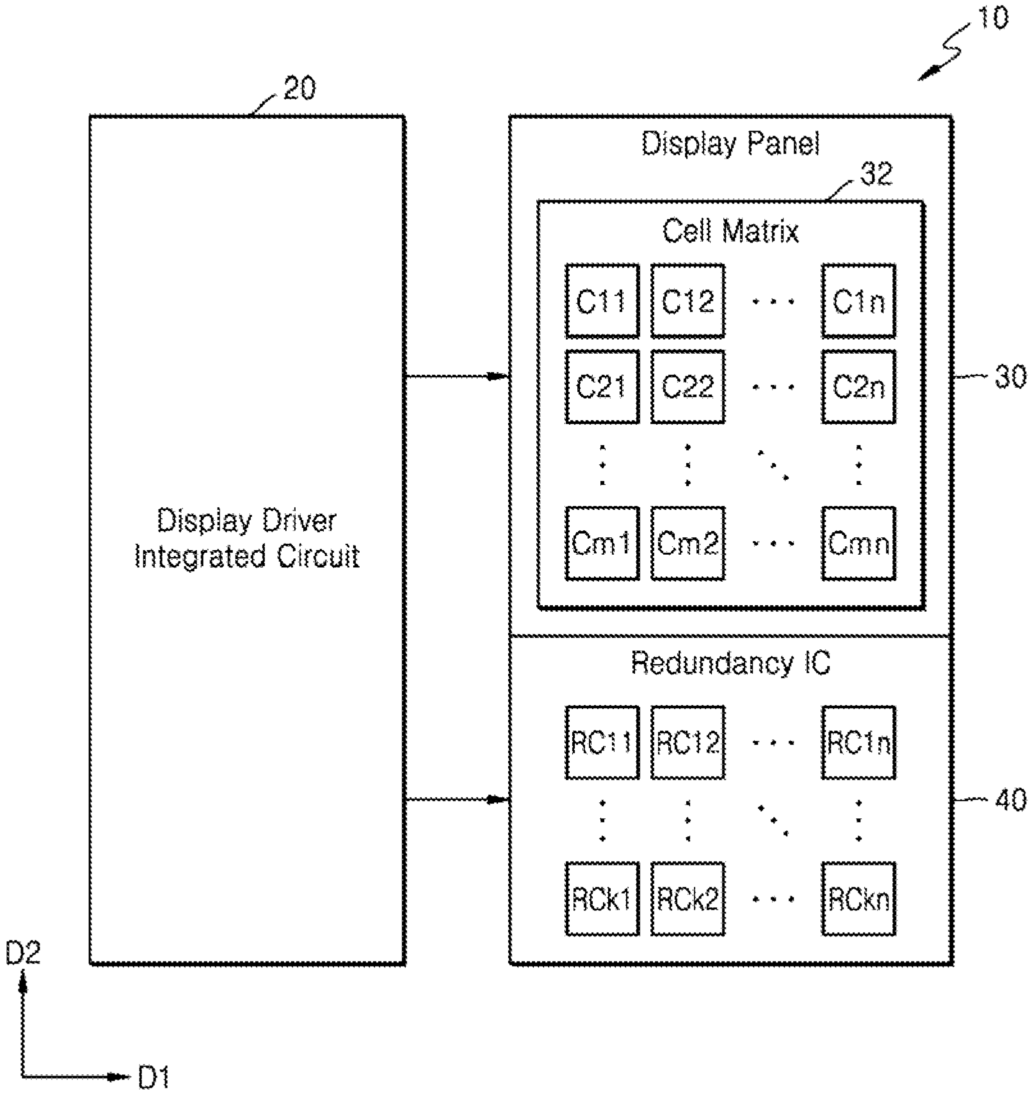
FIG. 1 is a block diagram of a display device according to an example embodiment.

FIG. 1 is a block diagram of a display device 10 according to an example embodiment.

The display device 10 may be mounted on an electronic device having an image display function.

Examples of the electronic device may include, e.g., a smartphone, a tablet personal computer (PC), a mobile phone, a video phone, an e-book reader, a desktop PC, a laptop PC, a netbook computer, a personal digital assistant (PDA), a portable multimedia player (PMP), a MP3 player, a mobile medical device, a camera, and a wearable device (e.g., a head-mounted device (HMD) such as electronic glasses, electronic clothes, an electronic bracelet, an electronic necklace, an electronic accessory, an electronic tattoo, or a smart watch). The electronic device may be a smart home appliance having an image display function. The smart home appliance may include, for example, at least one of a television, a digital video disk (DVD) player, an audio, a refrigerator, an air conditioner, a vacuum cleaner, an oven, a microwave, a washing machine, an air purifier, a set-top box (e.g., Samsung HomeSync™ Apple TV™, or Google TV™), a game console, an electronic dictionary, an electronic key, a camcorder, and an electronic picture frame. Examples of the electronic device may include at least one of various medical apparatuses (e.g., a magnetic resonance angiography (MRA) apparatus, a magnetic resonance imaging (MRI) apparatus, a computed tomography (CT) apparatus, a radiograph apparatus, a ultrasound apparatus, or the like), a navigation device, a global positioning system (GPS) receiver, an event data recorder (EDR), a flight data recorder (FDR), an automotive infotainment device, an electronic device for a ship (e.g., a navigation device and a gyro compass for a ship, or the like), avionics, a security device, a head unit for a vehicle, an industrial or household robot, an automatic teller's machine (ATM), and a point of sales (POS) of a store. Examples of the electronic device may include at least one of a piece of furniture or a part of building/structure including an image display function, an electronic board, an electronic signature receiving device, a projector, and various measuring devices (e.g., water supply, electricity, gas, or radio wave measuring devices, or the like). The electronic device may be a flexible display device. The electronic device may be a combination of one or more various devices described above.

Referring to FIG. 1, the display device 10 may include a display driver integrated circuit (DDI) 20, a display panel 30, and a redundancy integrated circuit (redundancy IC) 40.

The redundancy IC 40 may include a plurality of redundancy cells RC11 to RCkn for replacing bad cells in a cell matrix 32 of the display panel 30.

A bad cell may be a cell in which a control circuit included therein does not operate correctly. A redundancy cell may include a control circuit for replacing the operation of the control circuit of the bad cell. The redundancy cell may not include a separate light emitting element. In replacing the bad cell, the control circuit of the redundancy cell may be used to control the light emitting element of the bad cell, instead of using the control circuit of the bad cell to control the light emitting element of the bad cell.

The cell matrix 32 may include a plurality of cells C11 to Cmn. The plurality of cells C11 to Cmn may be arranged in an m row-by-n column (m×n) matrix form. The redundancy cells may be arranged in a k row-by-n column (k×n) matrix form. The number n of columns of the cell matrix 32 may be equal to the number n of columns of the matrix of redundancy cells.

The display device 10 may be a device in which the DDI 20, the display panel 30, and the redundancy IC 40 are implemented as one module. The DDI 20 and the redundancy IC 40 may be mounted on a substrate of the display panel 30. The redundancy IC 40 may be electrically connected to the display panel 30 through a connection member such as a flexible printed circuit board (FPCB) or the like.

The redundancy IC 40 may be arranged alongside or outside the cell matrix 32 in a manner that minimizes a distance to the plurality of cells C11 to Cmn in the cell matrix 32. The redundancy IC 40 may be arranged separately from the display panel 30, or may be arranged to be included in the display panel 30 and separated from the cell matrix 32. The redundancy IC 40 is shown as a separate component from the DDI 20 in FIG. 1, but the redundancy IC 40 may be included in the DDI 20.

The display panel 30 may display a real image, and examples thereof may include display devices that receive an electrically transmitted image signal to display an image, such as light emitting diode (LED) or organic light emitting diode (OLED) display, a thin film transistor-liquid crystal display (TFT-LCD), a filed emission display, a plasma display panel (PDP), or the like. Hereinafter, it may be assumed that the display panel 30 is an OLED display panel in which each of a plurality of pixels includes an OLED, but the display panel 30 may be implemented as a different kind of flat display panel or flexible display panel.

The display panel 30 may include the cell matrix 32, which may include the plurality of cells C11 to Cmn each capable of emitting an optical signal. Each of the plurality of cells C11 to Cmn may include a light emitting element and a control circuit connected to the light emitting element. A detailed configuration of the plurality of cells C11 to Cmn will be described below with reference to FIGS. 3 and 8.

In an implementation (not shown), the display panel 30 may include additional cell matrices, and bad cells included in the additional cell matrices may also be replaced with the plurality of redundancy cells RC11 to RCkn.

The DDI 20 may convert image data received from a host processor into a plurality of analog signals for driving the display panel 30, and supply the converted plurality of analog signals to the display panel 30. The DDI 20 may also supply the plurality of analog signals to the plurality of redundancy cells RC11 to RCkn for replacing some bad cells among the plurality of cells C11 to Cmn.

Some or all of the plurality of redundancy cells RC11 to RCkn may be used to replace bad cells. In various implementations, some of the plurality of redundancy cells RC11 to RCkn may be prepared in case the redundancy cells fail in use or otherwise develop a failure.

The redundancy IC 40 may be connected to the cell matrix 32 through a plurality of lines, so that the plurality of redundancy cells RC11 to RCkn may replace bad cells included in the plurality of cells C1 to Cmn. A connection structure between the cell matrix 32 and the redundancy IC 40 will be described below with reference to FIG. 2.

A distance between the plurality of cells C11 to Cmn in the cell matrix 32 (e.g., relative to the plurality of redundancy cells RC11 to RCkn) may be minimized, and defects in an output, e.g., an image output, of the cell matrix 32 may be reduced at the same time by arranging the redundancy IC 40 alongside or outside the cell matrix 32.

Figure 2:
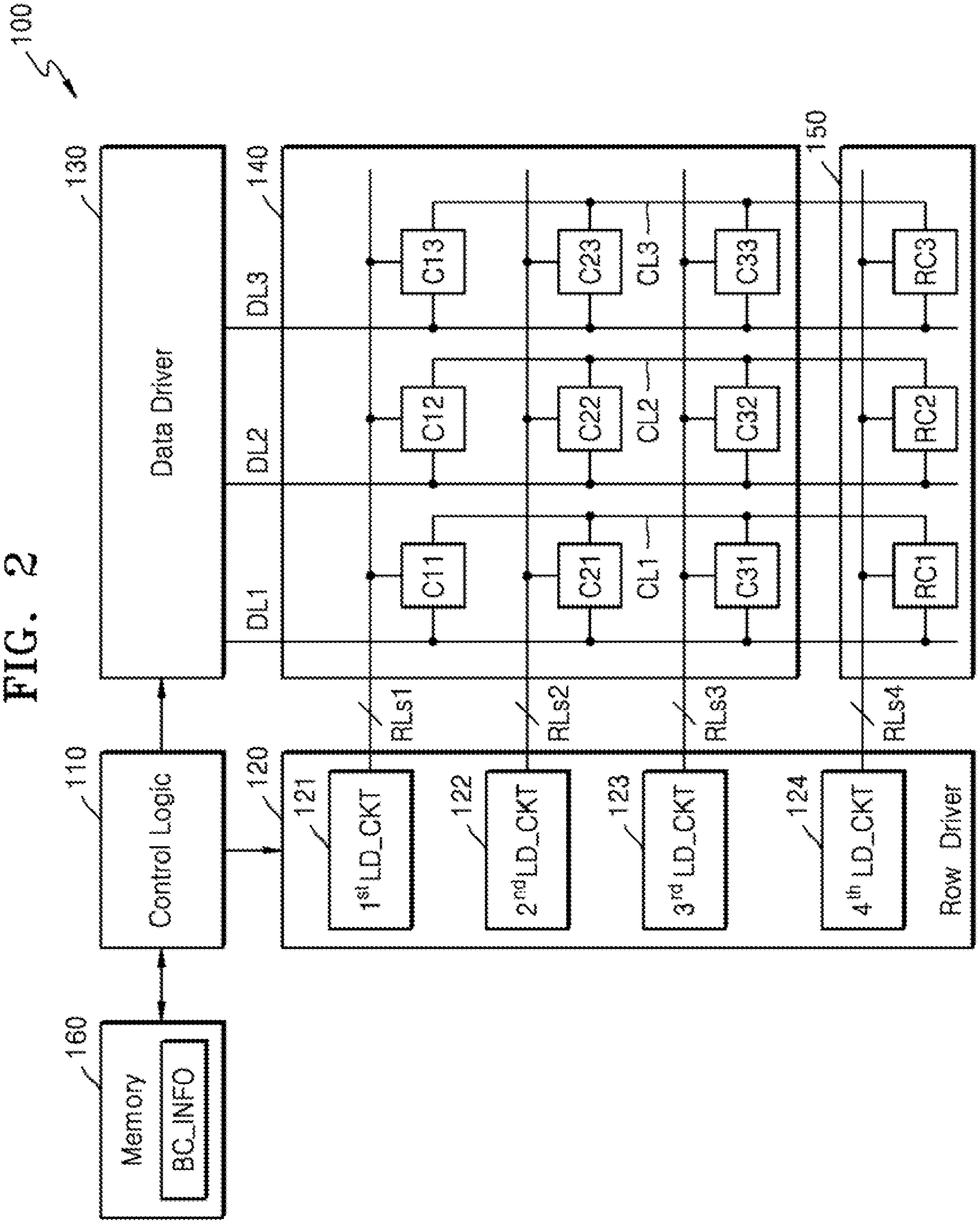
FIG. 2 is a block diagram of a display device according to an example embodiment.

FIG. 2 is a block diagram of a display device 100 according to an example embodiment.

In connection with FIG. 2, an example embodiment will be described in which a cell matrix 140 includes first to ninth cells C11 to C33 arranged in a 3×3 matrix form, and a redundancy IC 150 includes first to third redundancy cells RC1 to RC3, but it will be appreciated that the number and arrangement of the cells in the cell matrix and the redundancy cells may be varied.

Referring to FIG. 2, the display device 100 may include a control logic 110, a row driver 120, a data driver 130, the cell matrix 140, the redundancy IC 150, and a memory 160.

The row driver 120 and the data driver 130 may be components included in the DDI 20 of FIG. 1. The display device 100 may further include a voltage generator, a clock generator, etc., as a component included in the DDI 20 of FIG. 1.

The control logic 110 may control overall operations of the row driver 120 and the data driver 130. The control logic 110 may control the row driver 120 and the data driver 130 to output signals for allowing the first to third redundancy cells RC1 to RC3 to replace some of the first to ninth cells C11 to C33.

The row driver 120 may include first to fourth line driving circuits 121 to 124, in which the first line driving circuit 121 may drive the first to third cells C11 to C13 through first row lines RLs1, the second line driving circuit 122 may drive the fourth to sixth cells C21 to C23 through second row lines RLs2, the third line driving circuit 123 may drive the seventh to ninth cells C31 to C33 through third row lines RLs3, and the fourth line driving circuit 124 may drive the first to third redundancy cells RC1 to RC3 through fourth row lines RLs4. The row driver 120 may be referred to as a scan driver.

The first to fourth line driving circuits 121 to 124 are shown as being separated from each other in FIG. 2, but they may be integrated into one circuit.

The data driver 130 may transmit data to the first to ninth cells C11 to C33 and the first to third redundancy cells RC1 to RC3 through first to third data lines DL1 to DL3. A data line may be referred to as a column line.

The first to third cells C11 to C13 may share the first row lines RLs1, and may be respectively connected to the first to third data lines DL1 to DL3. The fourth to sixth cells C21 to C23 may share the second row lines RLs2, and may be respectively connected to the first to third data lines DL1 to DL3. The seventh to ninth cells C31 to C33 may share the third row lines RLs3, and may be respectively connected to the first to third data lines DL1 to DL3. The first to third redundancy cells RC1 to RC3 may share the fourth row lines RLs4, and may be respectively connected to the first to third data lines DL1 to DL3.

The first redundancy cell RC1 may be connected to each of the first, fourth, and seventh cells C11, C21, and C31 through a first connection line CL1. The second redundancy cell RC2 may be connected to each of the second, fifth, and eighth cells C12, C22, and C32 through a second connection line CL2. The third redundancy cell RC3 may be connected to each of the third, sixth, and ninth cells C13, C23, and C33 through a third connection line CL3.

Hereinafter, cells that share a same row line may be defined as a cell line. For example, the first to third cells C11 to C13 may be defined as a first cell line, the fourth to sixth cells C21 to C23 may be defined as a second cell line, and the seventh to ninth cells C31 to C33 may be defined as a third cell line. In addition, the first to third redundancy cells RC1 to RC3 may be defined as a redundancy cell line.

In an example embodiment, a cell line that has a bad cell (or more than one bad cell) may be replaced by the redundancy cell line. For example, if the first cell C11 is a bad cell in the first cell line, the redundancy cell line may replace the first cell line (i.e., the first to third cells C11 to C13) using signals received through the first row lines RLs1 and the fourth row lines RLs4.

In an example embodiment, the control logic 110 may detect a bad cell in the cell matrix 140, and may control the row driver 120 and the data driver 130 based on a detection result. The control logic 110 may store bad cell-related information BC_INFO (indicating the detection result) in the memory 160, and obtain the bad cell-related information BC_INFO by accessing the memory 160. The bad cell-related information BC_INFO may include information such as a position, a number, etc., related to the bad cell in the cell matrix 140. Accordingly, the control logic 110 may control the row driver 120 and the data driver 130 based on the bad cell-related information BC_INFO without repeatedly performing a bad cell detection operation.

In another example embodiment, the bad cell-related information BC_INFO may be derived from a mass production operation of the display device 100, and may be stored in advance in the memory 160 when a product is shipped.

Examples of the memory 160 may include a non-volatile memory, such as read-only memory (ROM), flash memory, resistive random access memory (ReRAM), and magnetic random access memory (MRAM).

Figure 3:
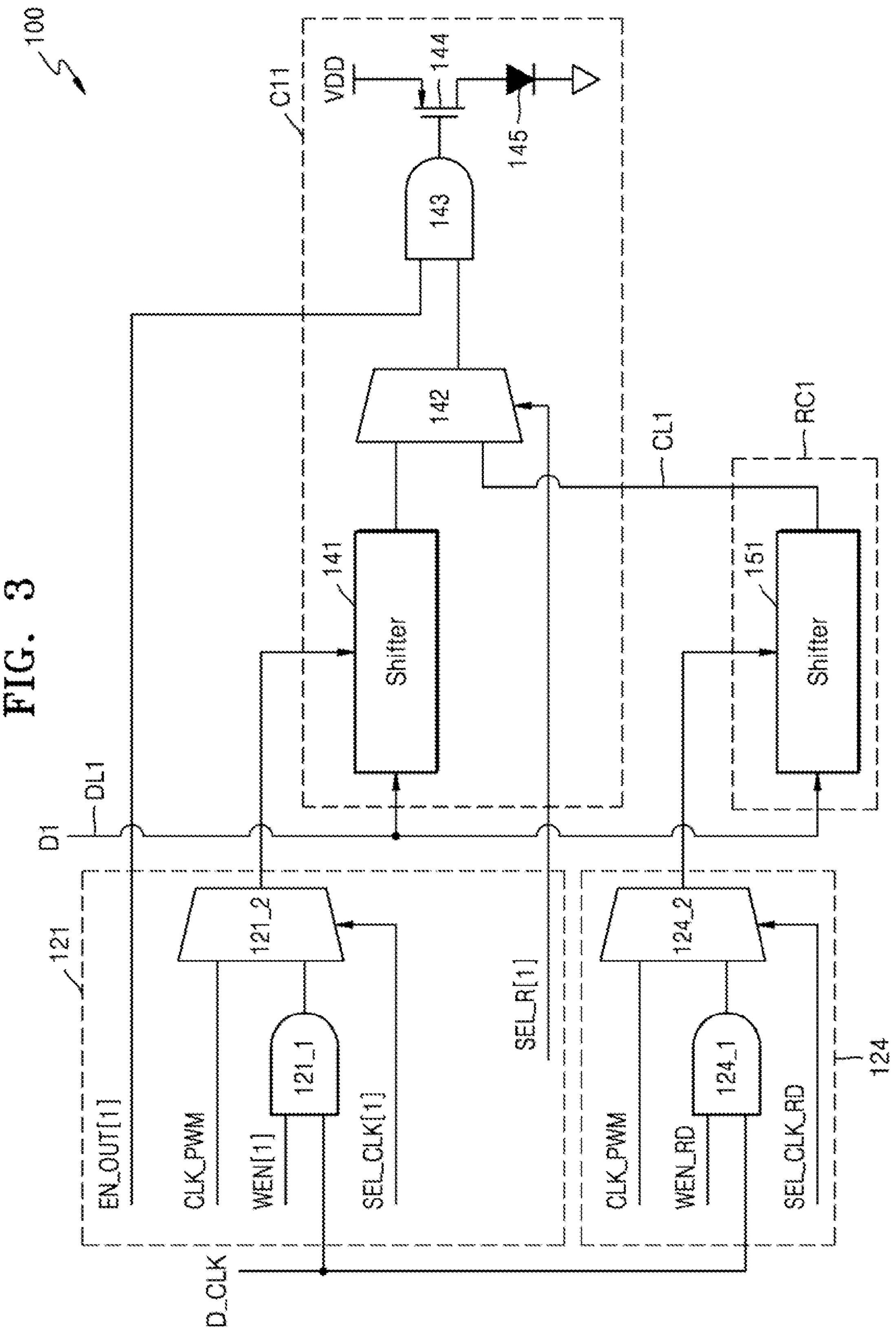
FIG. 3 is a diagram illustrating aspects of a display device according to an example embodiment.

FIG. 3 is a diagram illustrating aspects of the display device 100 according to an example embodiment.

FIG. 3 illustrates examples of the first cell C11, the first redundancy cell RC11, the first line driving circuit 121, and the fourth line driving circuit 124 of FIG. 2. The examples shown in FIG. 3 may also be applied to the second to ninth cells C12 to C33, the second and third redundancy cells RC2 and RC3, and the second to third line driving circuits 122 and 123 of FIG. 2.

Referring to FIG. 3, the first line driving circuit 121 may include a first AND gate 121_1 and a first multiplexer 121_2. The fourth line driving circuit 124 may include a fourth AND gate 124_1 and a fourth multiplexer 124_2.

The first cell C11 may include a first shifter 141, a fifth multiplexer 142, a fifth AND gate 143, a transistor 144, and a light emitting element 145.

The first redundancy cell RC1 may include a second shifter 151.

Referring to the first line driving circuit 121, the first AND gate 121_1 may receive a data clock D_CLK and a first write enable signal WEN[1]. The first multiplexer 121_2 may select and output one of the data clock D_CLK received from the first AND gate 121_1 and a pulse width modulation (PWM) clock CLK_PWM based on a first clock selection signal SEL_CLK[1]. In addition, the first line driving circuit 121 may output a first output enable signal EN_OUT[1] and a first replacement selection signal SEL_R[1]. The first output enable signal EN_OUT[1], an output of the first multiplexer 121_2, and the first replacement selection signal SEL_R[1] may be transmitted to the first cell C11 through the first row lines RLs1 of FIG. 2.

Referring to the fourth line driving circuit 124, the fourth AND gate 124_1 may receive the data clock D_CLK and a redundancy write enable signal WEN_RD. The fourth multiplexer 124_2 may select and output one of the data clock D_CLK received from the fourth AND gate 124_1 and the PWM clock CLK_PWM based on a redundancy clock selection signal SEL_CK_RD. An output of the fourth multiplexer 124_2 may be transmitted to the first redundancy cell RC1 through the fourth row lines RLs4 of FIG. 2, which may be implemented as a fourth row line RL4 (see FIG. 4).

Referring to the first cell C11, the first shifter 141 may be connected to a first data line D1 to receive first data D1 including a plurality of bits. The first shifter 141 may store the first data based on the data clock D_CLK received from the first multiplexer 121_2. The first shifter 141 may sequentially output the first data in a unit of bits based on the PWM clock CLK_PWM received from the first multiplexer 121_2.

Referring to the first redundancy cell RC1, the second shifter 151 may be connected to the first data line D1 to receive the first data D1 including the plurality of bits. The second shifter 151 may store the first data D1 based on the data clock D_CLK received from the fourth multiplexer 124_2. The second shifter 151 may sequentially output the first data D1 in a unit of bits based on the PWM clock CLK_PWM received from the fourth multiplexer 124_2. An output of the second shifter 151 may be transmitted to the first cell C1 through the first connection line CL1.

Referring to the first cell C11 again, the fifth multiplexer 142 may select and output one of the output of the first shifter 141 and the output of the second shifter 151 based on the first replacement selection signal SEL_R[1]. For example, when the first replacement selection signal SEL_R [1] is logic high, the first cell C11 may be identified as a bad cell, and the fifth multiplexer 142 may output the output of the second shifter 151 to the fifth AND gate 143. Accordingly, the first redundancy cell RC1 may replace the control of the first cell C11. As another example, when the first replacement selection signal SEL_R[1] is logic low, the first cell C11 may be identified a normal cell, and the fifth multiplexer 142 may output the output of the first shifter 141 to the fifth AND gate 143.

The fifth AND gate 143 may receive the output of the fifth multiplexer 142 and the first output enable signal EN_OUT [1]. The transistor 144 may provide a power supply voltage VDD to the light emitting element 145 in response to an output of the fifth AND gate 143. The transistor 144 may be a p-channel metal-oxide-semiconductor field-effect transistor (MOSFET).

Figure 4:
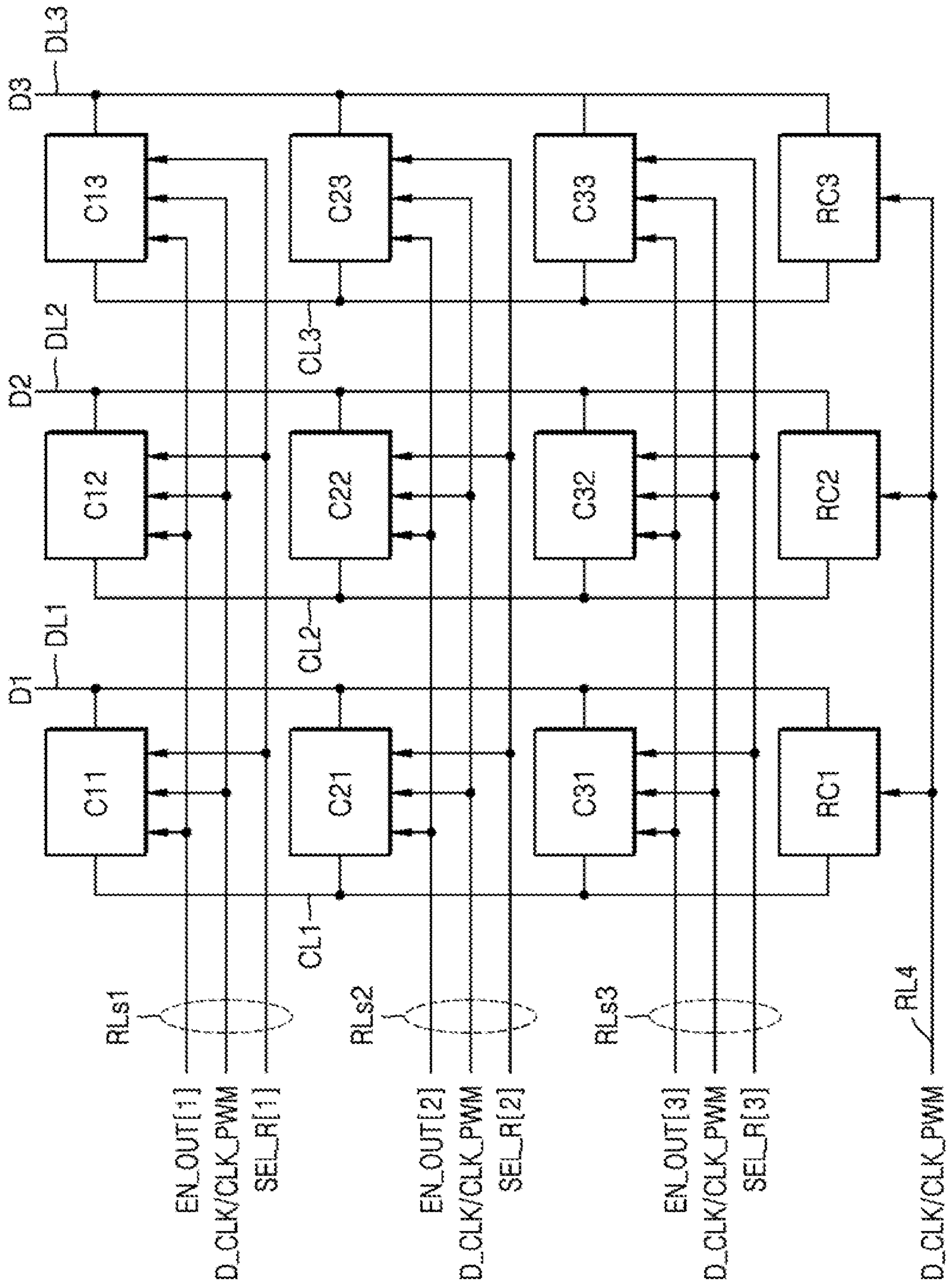
FIG. 4 is a diagram for explaining a line connection structure of a display device according to an example embodiment.

FIG. 4 is a diagram for explaining a line connection structure of a display device according to an example embodiment.

The line connection structure of FIG. 4 is an embodiment in which the cell matrix 140 and the redundancy IC 150 shown in FIG. 2 are embodied.

Referring to FIG. 4, the first to third cells C11 to C13 may share the first row lines RLs1. The fourth to sixth cells C21 to C23 may share the second row lines RLs2. The seventh to ninth cells C31 to C33 may share the third row lines RLs3. The fourth row lines RLs4 of FIG. 2 may be provided as a fourth row line RL4, and the first to third redundancy cells RC1 to RC3 may share the fourth row line RL4.

The first to third cells C11, C12, and C13 may receive, from the row driver, the first output enable signal EN_OUT [1], the first replacement selection signal SEL_R[1], and the data clock D_CLK or the PWM clock CLK_PWM through the first row lines RLs1. The fourth to sixth cells C21, C22, and C23 may receive, from the row driver, a second output enable signal EN_OUT[2], a second replacement selection signal SEL_R[2], and the data clock D_CLK or the PWM clock CLK_PWM through the second row lines RLs2. The seventh to ninth cells C31, C32, and C33 may receive, from the row driver, a third output enable signal EN_OUT[3], a third replacement selection signal SEL_R[3], and the data clock D_CLK or the PWM clock CLK_PWM through the third row lines RLs3. The first to third redundancy cells RC1 to RC3 may receive the data clock D_CLK or the PWM clock CLK_PWM through the fourth row line RL4.

The first, fourth, and seventh cells C11, C21, and C31, and the first redundancy cell RC1 may be connected to the first data line D1 and the first connection line CL1. The second, fifth, and eighth cells C12, C22, and C32, and the second redundancy cell RC2 may be connected to a second data line DL2 and the second connection line CL2. The third, sixth, and ninth cells C13, C23, and C33, and the third redundancy cell RC3 may be connected to a third data line DL3 and the third connection line CL3.

The first, fourth, and seventh cells C11, C21, and C31, and the first redundancy cell RC1 may receive the first data D1 through the first data line DL1. The second, fifth, eighth cells C12, C22, and C32, and the second redundancy cell RC2 may receive second data D2 through the second data line DL2. The third, sixth, and ninth cells C13, C23, and C33, and the third redundancy cell RC3 may receive third data D3 through the third data line DL3.

Using the line connection structure described above in connection with FIG. 4, the redundancy cell line including the first to third redundancy cells RC1 to RC3 may replace the first cell line including the first to third cells C11, C12, and C13, the second cell line including the fourth to sixth cells C21, C22, and C23, or the third cell line including the seventh to ninth cells C31, C32, and C33.

Figure 5A:
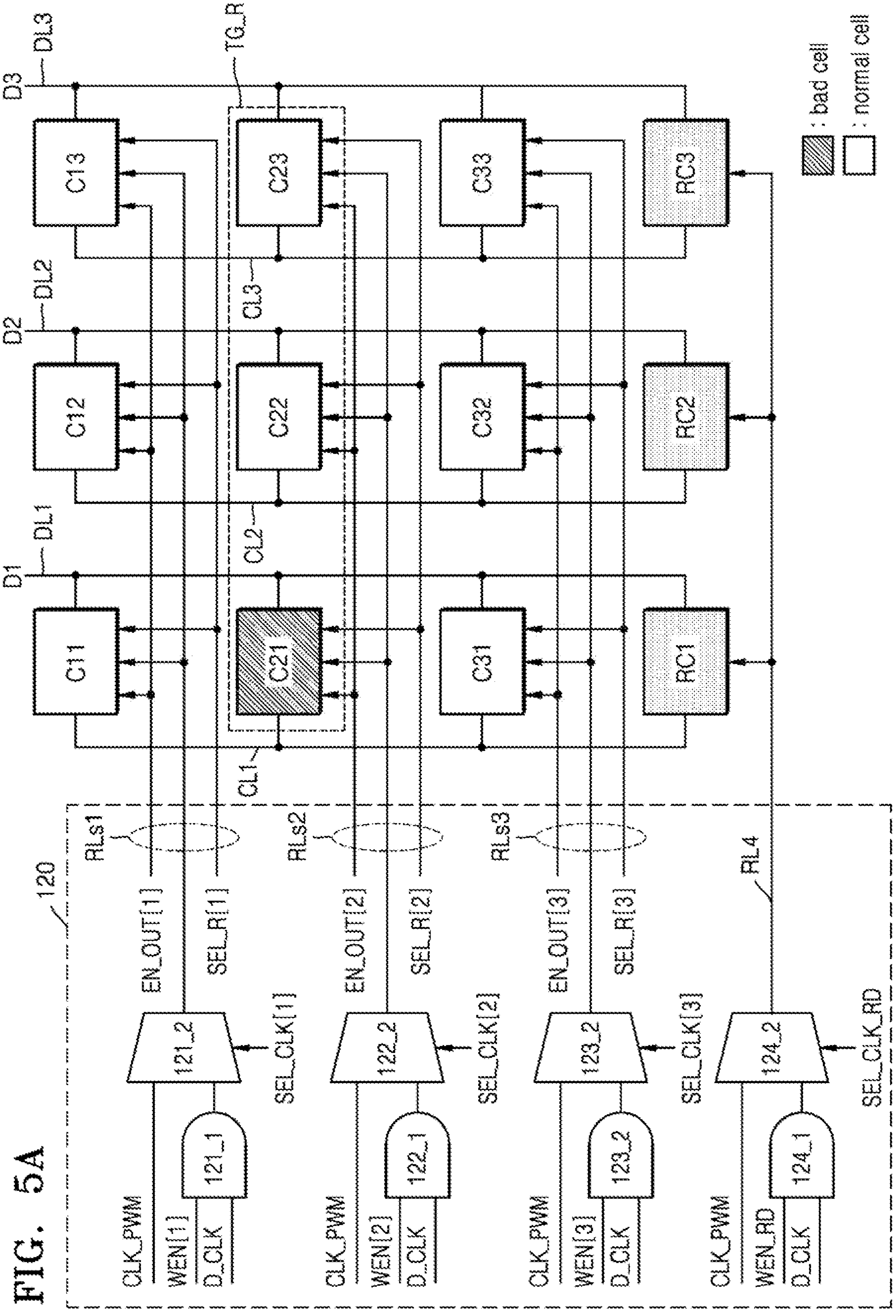
FIGS. 5A and 5B are diagrams for explaining an operation method according to an example embodiment.
Figure 5B:
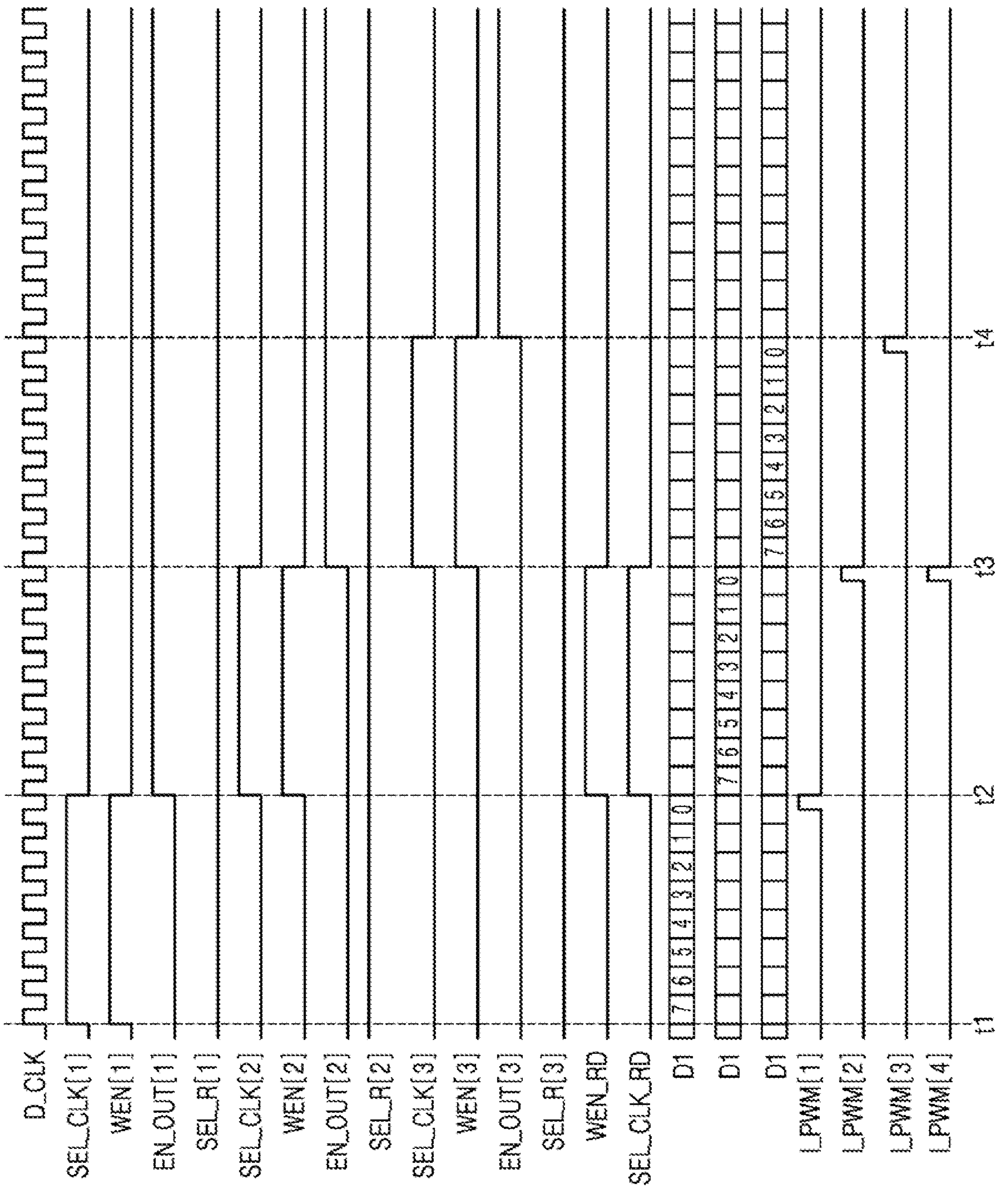

FIGS. 5A and 5B are diagrams for explaining an operation method according to an example embodiment.

A line connection structure of FIG. 5A is an embodiment in which the row driver 120, the cell matrix 140, and the redundancy IC 150 shown in FIG. 2 are embodied. Hereinafter, descriptions already given with reference to FIG. 4 may be omitted in describing FIG. 5A.

In FIG. 5A, it is assumed that the fourth cell C21 is a bad cell, and the timing diagram of FIG. 5B corresponds to FIG. 5A.

Referring to FIG. 5A, the row driver 120 may include first to fourth AND gates 121_1 to 124_1 and first to fourth multiplexers 121_2 to 124_2.

The first AND gate 121_1 may receive the data clock D_CLK and the first write enable signal WEN[1]. The first multiplexer 121_2 may select and output one of the data clock D_CLK received from the first AND gate 121_1 and the PWM clock CLK_PWM based on a first clock selection signal SEL_CLK[1].

The second AND gate 122_1 may receive the data clock D_CLK and a second write enable signal WEN[2]. The second multiplexer 122_2 may select and output one of the data clock D_CLK received from the second AND gate 122_1 and the PWM clock CLK_PWM based on a second clock selection signal SEL_CLK[2].

The third AND gate 123_1 may receive the data clock D_CLK and a third write enable signal WEN_[3]. The third multiplexer 123_2 may select and output one of the data clock D_CLK received from the third AND gate 123_1 and the PWM clock CLK_PWM based on a third clock selection signal SEL_CLK[3].

The fourth AND gate 124_1 may receive the data clock D_CLK and the redundancy write enable signal WEN_RD. The fourth multiplexer 124_2 may select and output one of the data clock D_CLK received from the fourth AND gate 124_1 and the PWM clock CLK_PWM based on a redundancy clock selection signal SEL_CK_RD.

Referring further to FIG. 5B, the first cell C11 operates in a first period of first to second times t1 to t2, the fourth cell C21 operates in a second period of second to third times t2 to t3, and the seventh cell C31 operates in a third period of third to fourth times t3 to t4.

In the first period, the first clock selection signal SEL_CLK[1] and the first write enable signal WEN[1] may be logic high. At this time, the first multiplexer 121_2 may output the data clock D_CLK. The first cell C11 may store the first data D1 in a shifter of the first cell C11 based on the data clock D_CLK. Because the first replacement selection signal SEL_R[1] is logic low, an output of the shifter (see the shifter 141 of FIG. 3) of the first cell C11 may be selected and provided to a transistor in the first cell C11 based on a PWM clock enabled in response to a first PWM start signal I_PWM[1].

In the second period, the second clock selection signal SEL_CLK[2] and the second write enable signal WEN[2] may be logic high. At this time, the second multiplexer 122_2 may output the data clock D_CLK. The fourth cell C21 may store the first data D1 in a shifter of the fourth cell C21 based on the data clock D_CLK. The shifter of the fourth cell C21 may output the first data D1 based on a PWM clock enabled in response to the first PWM start signal I_PWM[1]. Meanwhile, the redundancy write enable signal WEN_RD and the redundancy clock selection signal SEL_CK_RD may be logic high. At this time, the fourth multiplexer 124_2 may output the data clock D_CLK. The first redundancy cell RC1 may store the first data D1 in a shifter of the first redundancy cell RC1 based on the data clock D_CLK. Because the second replacement selection signal SEL_R[2] is logic low, the first redundancy cell RC1 may replace the fourth cell C21. That is, an output of the shifter of the first redundancy cell RC1 may be selected, and the first data D1 may be output to a transistor in the fourth cell C21 based on a PWM clock enabled in response to a fourth PWM start signal I_PWM[4].

In the third period, the third clock selection signal SEL_CLK[3] and the third write enable signal WEN_[3] may be logic high. At this time, the third multiplexer 123_2 may output the data clock D_CLK. The seventh cell C31 may store the first data D1 in a shifter of the seventh cell C31 based on the data clock D_CLK. Because the third replacement selection signal SEL_R[3] is logic low, an output of the shifter of the seventh cell C31 may be selected and provided to a transistor in the seventh cell C31 based on a PWM clock enabled in response to a third PWM start signal I_PWM[3].

Figure 6:
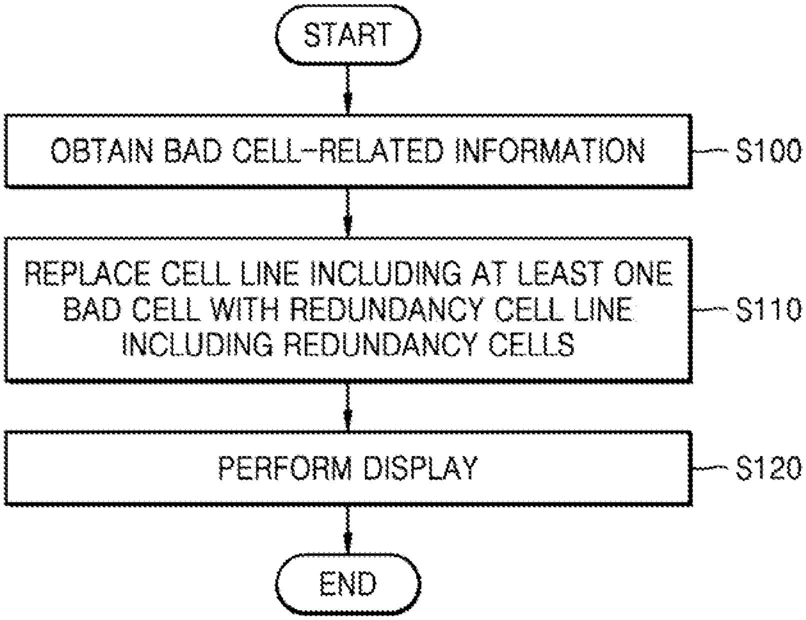
FIG. 6 is a flowchart illustrating an operation method of a display device according to an example embodiment.

FIG. 6 is a flowchart illustrating an operation method of a display device according to an example embodiment.

Referring to FIG. 6, in operation S100, the display device may obtain bad cell-related information of a cell matrix. The bad cell-related information may be stored in a memory in the display device and obtained from the memory. The display device may perform a bad cell detection operation on the cell matrix to obtain the bad cell-related information from a detection result. The bad cell-related information may be derived from a mass production operation of the display device, and may be stored in advance in the memory when a product is shipped.

In operation S110, the display device may replace a cell line including at least one bad cell with a redundancy cell line including redundancy cells.

In operation S120, the display device may perform display by using normal cell lines (each including normal cells) and the redundancy cell line (replacing the cell line that includes the at least one bad cell).

Figure 7:
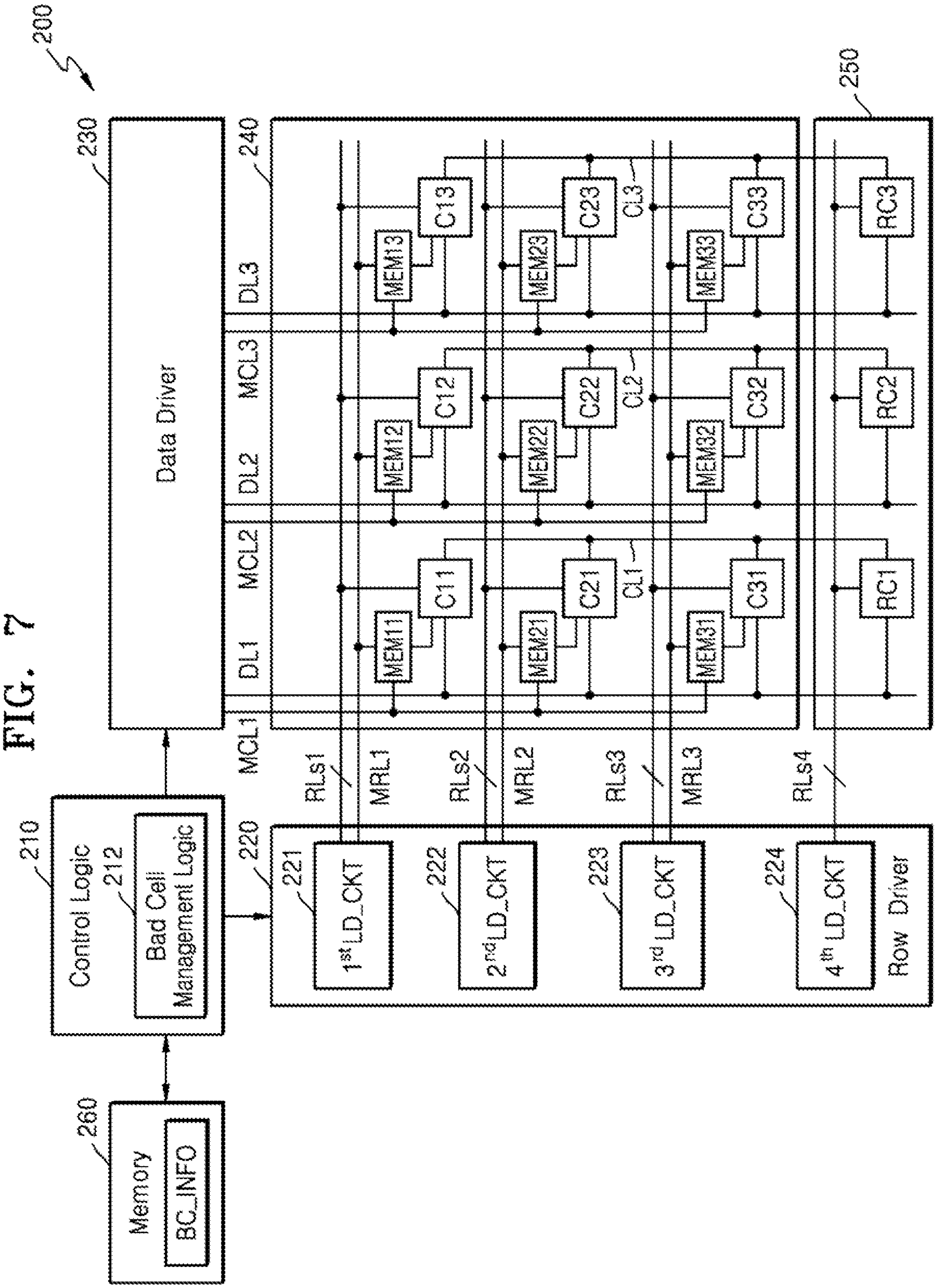
FIG. 7 is a block diagram of a display device according to an example embodiment.

FIG. 7 is a block diagram of a display device 200 according to an example embodiment.

In FIG. 7, descriptions already given with reference to the display device 100 of FIG. 2 may be omitted.

Referring to FIG. 7, the display device 200 may include a control logic 210, a row driver 220, a data driver 230, a cell matrix 240, a redundancy IC 250, and a memory 260.

The cell matrix 240 may include first to ninth memory elements MEM11 to MEM33 respectively connected to the first to ninth cells C11 to C33. The first to ninth cells C11 to C33 may be implemented to include the first to ninth memory elements MEM11 to MEM33 respectively corresponding thereto.

The first to third memory elements MEM11 to MEM13 may share a first memory row line MRL1. The first to third memory elements MEM11 to MEM13 may be respectively connected to first to third memory column lines MCL1 to MCL3.

The fourth to sixth memory elements MEM21 to MEM23 may share a second memory row line MRL2. The fourth to sixth memory elements MEM21 to MEM23 may be respectively connected to the first to third memory column lines MCL1 to MCL3.

The seventh to ninth memory elements MEM31 to MEM33 may share a third memory row line MRL3. The seventh to ninth memory elements MEM31 to MEM33 may be respectively connected to the first to third memory column lines MCL1 to MCL3.

The first to ninth memory elements MEM11 to MEM33 may store values indicating whether the first to ninth cells C11 to C33 respectively connected thereto are bad cells. As an example, when the first cell C11 is a bad cell, the first memory element MEM11 may store a value of '1'. As another example, when the second cell C12 is a normal cell, the second memory element MEM12 may store a value of '0'.

In the first to ninth cells C11 to C33, bad cells may be replaced with the first to third redundancy cells RC1 to RC3 based on the values stored in the first to ninth memory elements MEM11 to MEM33. This will be described in more detail below with reference to FIG. 8.

In the row driver 220, a first line driving circuit 221 may be connected to the first memory row line MRL1. A second line driving circuit 222 may be connected to the second memory row line MRL2. A third line driving circuit 223 may be connected to the third memory row line MRL3.

The data driver 230 may be connected to the first to third memory column lines MCL1, MCL2, and MCL3.

The row driver 220 may transmit a first memory enable signal through the first memory row line MRL1, and the first to third memory elements MEM11 to MEM13 may be enabled in response to the first memory enable signal. Then, the data driver 230 may transmit first to third memory setting signals respectively through the first to third memory column lines MCL1 to MCL3, and the first to third memory elements MEM11 to MEM13 may store values respectively corresponding to the first to third memory setting signals.

The row driver 220 may transmit a second memory enable signal through the second memory row line MRL2, and the fourth to sixth memory elements MEM21 to MEM23 may be enabled in response to the second memory enable signal. Then, the data driver 230 may transmit the first to third memory setting signals respectively through the first to third memory column lines MCL1 to MCL3, and the fourth to sixth memory elements MEM21 to MEM23 may store values respectively corresponding to the first to third memory setting signals.

The row driver 220 may transmit a third memory enable signal through the third memory row line MRL3, and the seventh to ninth memory elements MEM31 to MEM33 may be enabled in response to the third memory enable signal. Then, the data driver 230 may transmit the first to third memory setting signals respectively through the first to third memory column lines MCL1 to MCL3, and the seventh to ninth memory elements MEM31 to MEM33 may store values respectively corresponding to the first to third memory setting signals.

The control logic 210 may obtain the bad cell-related information BC_INFO stored in the memory 260, and may store certain values in the first to ninth memory elements MEM11 to MEM33 by controlling the row driver 220 and the data driver 230 based on the bad cell-related information BC_INFO.

The control logic 210 may include a bad cell management logic 212. The bad cell management logic 212 may control the row driver 220 and the data driver 230 to perform an operation of detecting a bad cell included in the cell matrix 240. The bad cell management logic 212 may generate the bad cell-related information BC_INFO based on a detection result and then store the same in the memory 260. The bad cell management logic 212 may update the bad cell-related information BC_INFO by periodically or aperiodically controlling the operation of detecting a bad cell.

As described above, and as further described in connection with FIG. 8 below, relative to the display device 100 shown in FIG. 2, the display device 200 according to the present example embodiment may only replace a bad cell with a redundancy cell by using the first to ninth memory elements MEM11 to MEM33.

Figure 8:
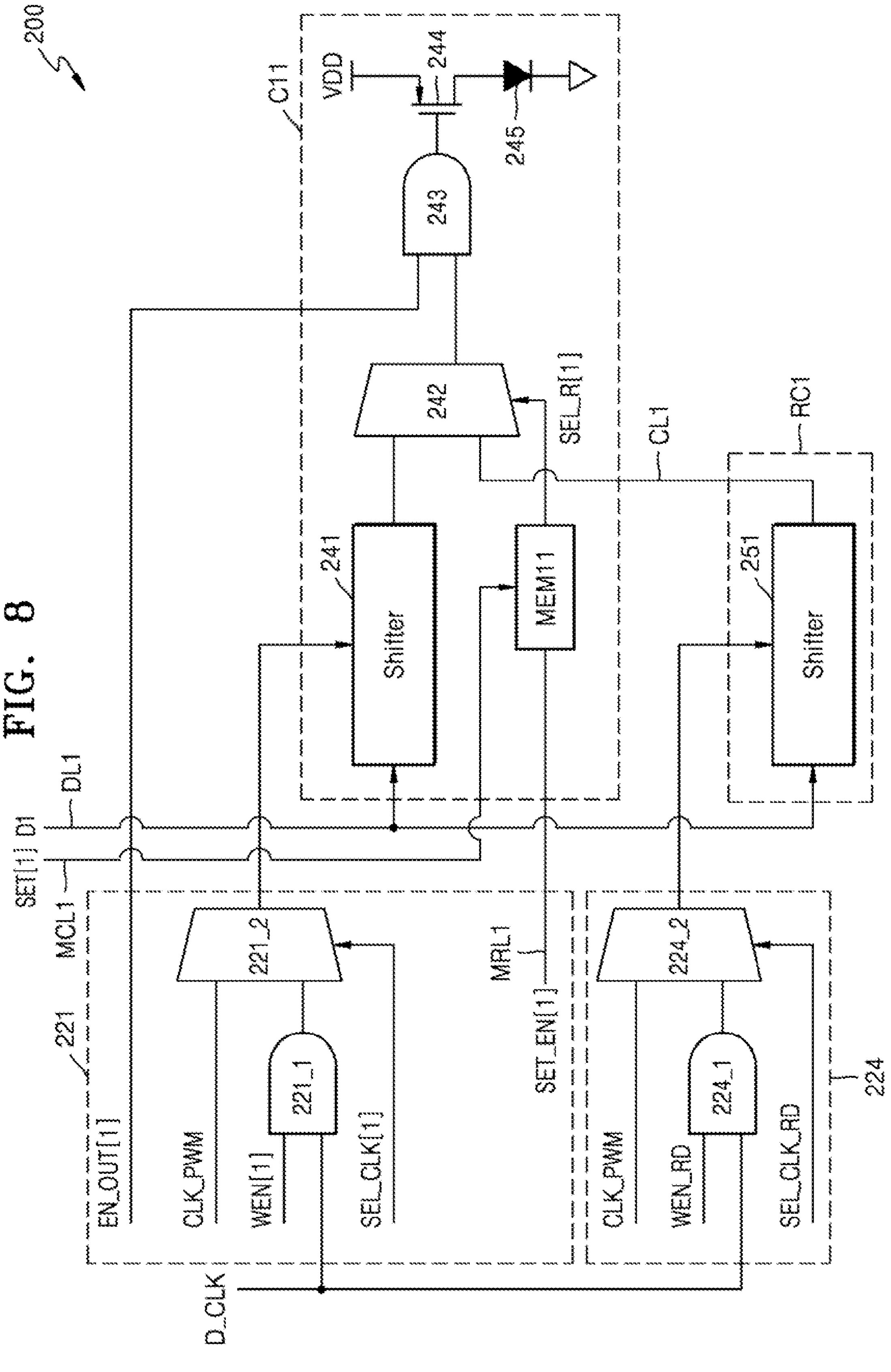
FIG. 8 is a diagram illustrating a display device according to an example embodiment.

FIG. 8 is a diagram illustrating an implementation embodiment of the display device 200 according to an example embodiment.

FIG. 8 shows an implementation embodiment of the first cell C11, the first redundancy cell RC1, the first line driving circuit 221, and a fourth line driving circuit 224 of FIG. 7. The embodiment shown in FIG. 8 may also be applied to the second to ninth cells C12 to C33, the second and third redundancy cells RC2 and RC3, and the second and third driving circuits 222 and 223 of FIG. 7.

Hereinafter, difference from the display device 100 of FIG. 3 will be mainly described below.

Referring to FIG. 8, the first cell C11 may include a first shifter 241, the first memory element MEM11, a fifth multiplexer 242, a fifth AND gate 243, a transistor 244, and a light emitting element 245.

The first memory element MEM11 may be connected to the first line driving circuit 221 through the first memory row line MRL1. The first memory element MEM11 may receive, from the first line driving circuit 221, a first memory enable signal SET_EN[1] through the first memory row line MRL1. The first memory element MEM11 may be connected to the data driver 230 (in FIG. 7) through the first memory column line MCL1. The first memory element MEM11 may receive a first memory setting signal SET[1] through the first memory column line MCL1. The first memory element MEM11 may store a value corresponding to the first memory setting signal SET[1].

The first memory element MEM11 may output the first replacement selection signal SEL_R[1] (corresponding to a value stored therein) to the fifth multiplexer 242.

The fifth multiplexer 242 may select and output one of an output of the first shifter 241 and an output of a second shifter 251 based on the first replacement selection signal SEL_R[1]. For example, when the first replacement selection signal SEL_R[1] is logic high, the first cell C11 may be identified as a bad cell, and the fifth multiplexer 242 may output the output of the second shifter 251 to the fifth AND gate 243. Accordingly, the first redundancy cell RC1 may replace the control of the first cell C11. As another example, when the first replacement selection signal SEL_R[1] is logic low, the first cell C11 may be identified as a normal cell, and the fifth multiplexer 242 may output the output of the first shifter 241 to the fifth AND gate 243.

Figure 9:
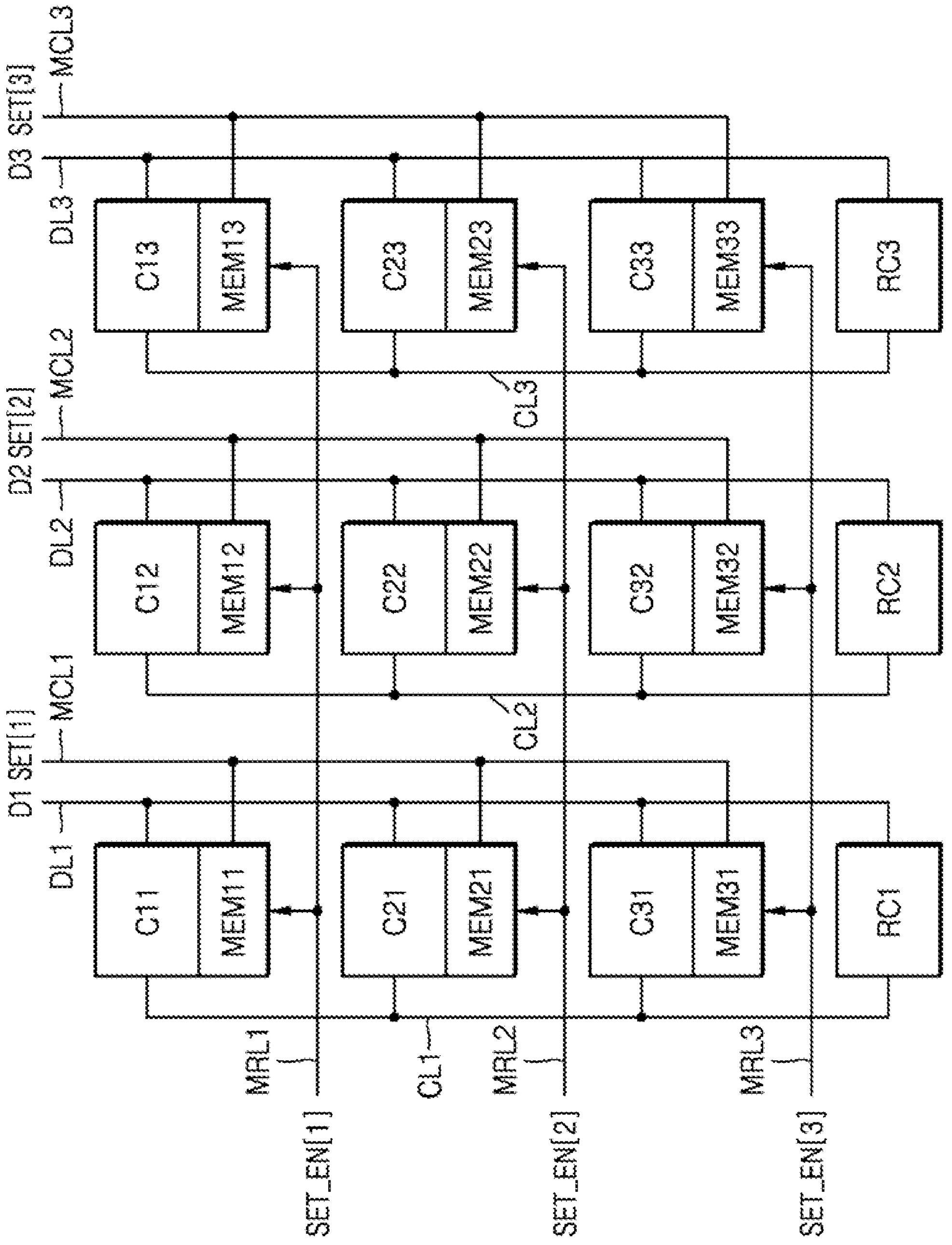
FIG. 9 is a diagram for explaining a line connection structure of a display device according to an example embodiment.

FIG. 9 is a diagram for explaining a line connection structure of a display device according to an example embodiment.

The line connection structure of FIG. 9 is an embodiment in which the cell matrix 240 and the redundancy IC 250 shown in FIG. 7 are embodied.

Hereinafter, a structure different from that shown in FIG. 4 is mainly described below.

Referring to FIG. 9, the first to ninth memory elements MEM11 to MEM33 may be respectively connected to the first to ninth cells C11 to C33. The first to third memory elements MEM11 to MEM13 may share the first memory row line MRL1 to receive the first memory enable signal SET_EN[1] through the first memory row line MRL1. The fourth to sixth memory elements MEM21 to MEM23 may share the second memory row line MRL2 to receive a second memory enable signal SET_EN[2] through the second memory row line MRL2. The seventh to ninth memory elements MEM31 to MEM33 may share the third memory row line MRL3 to receive a third memory enable signal SET_EN[3] through the third memory row line MRL3.

The first, fourth, and seventh memory elements MEM11, MEM21, and MEM31 may share the first memory column line MCL1 to receive the first memory setting signal SET[1] through the first memory column line MCL1. The second, fifth, and eighth memory elements MEM12, MEM22, and MEM32 may share the second memory column line MCL2 to receive a second memory setting signal SET[2] through the second memory column line MCL2. The third, sixth, and ninth memory elements MEM13, MEM23, and MEM33 may share the third memory column line MCL3 to receive a third memory setting signal SET[3] through the third memory column line MCL3.

Figure 10:
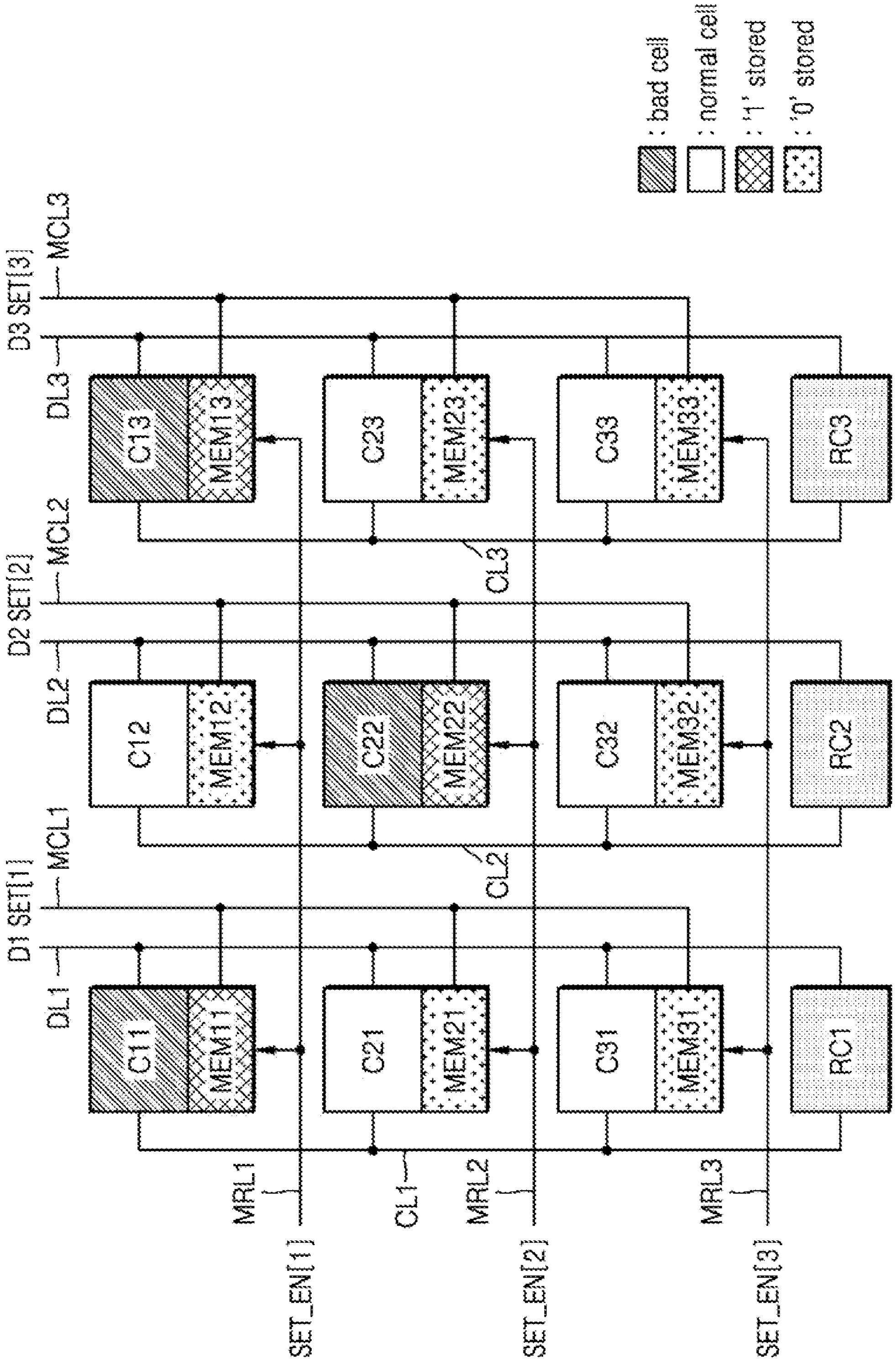
FIG. 10 is a diagram for explaining an operation method of a display device according to an example embodiment.

FIG. 10 is a diagram for explaining an operation method of a display device according to an example embodiment.

In FIG. 10, it is assumed that the first, third, and fifth cells C11, C13, and C22 are bad cells.

Referring to FIG. 10, a value of '1' may be stored in the first, third, and fifth memory elements MEM11, MEM13, and MEM22 respectively corresponding to the first, third, and fifth cells C11, C13, and C22 to indicate that the first, third, and fifth cells C11, C13, and C22 are bad cells. A value of '0' may be stored in remaining second, fourth, and sixth to ninth memory elements MEM12, MEM21, MEM23, MEM31, MEM32, and MEM33 respectively corresponding to remaining second, fourth, and sixth to ninth cells C12, C21, C23, C31, C32, and C33 to indicate that the remaining second, fourth, and sixth to ninth cells C12, C21, C23, C31, C32, and C33 are normal cells.

The first cell C11 may be replaced with the first redundancy cell RC1 connected through the first connection line CL1 in response to a replacement selection signal received from the first memory element MEM11. The third cell C13 may be replaced with the third redundancy cell RC3 connected through the third connection line CL3 in response to a replacement selection signal received from the third memory element MEM13. The fifth cell C22 may be replaced with the second redundancy cell RC2 connected through the second connection line CL2 in response to a replacement selection signal received from the fifth memory element MEM22.

Figure 11:
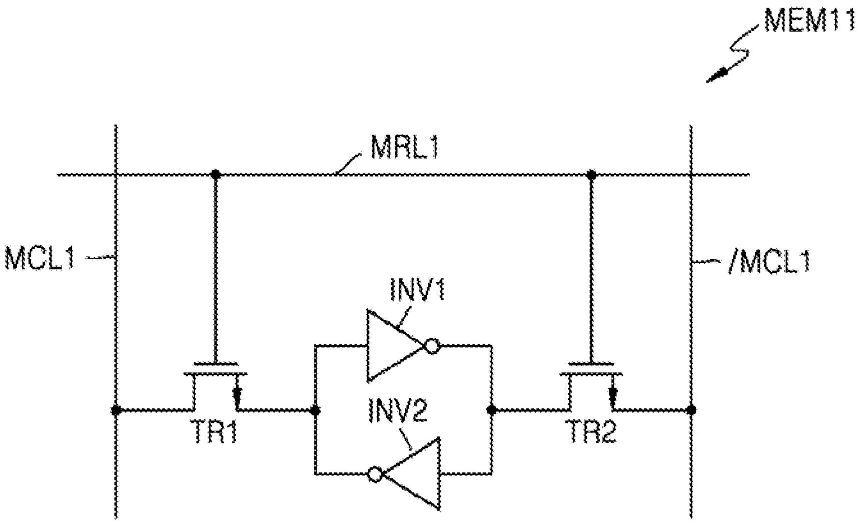
FIG. 11 is a diagram illustrating an example of a first memory element of FIG. 7.

FIG. 11 is a diagram illustrating an example of the first memory element MEM11 of FIG. 7.

The implementation embodiment of the first memory element MEM11 of FIG. 11 may also be applied to other second to ninth memory elements MEM12 to MEM33 of FIG. 7.

Referring to FIG. 11, the first memory element MEM11 may include a first transistor TR1, a second transistor TR2, a first inverter INV1, and a second inverter INV2. The first and second transistors TR1 and TR2 may be n-channel MOSFETs. A gate terminal of each of the first and second transistors TR1 and TR2 may be connected to the first memory row line MRL1, a drain terminal of the first transistor TR1 may be connected to the first memory column line MCL1, and a source terminal of the second transistor TR2 may be connected to a first inverted memory column line/MCL1. The first and second inverters INV1 and INV2 may be connected between a source terminal of the first transistor TR1 and a drain terminal of the second transistor TR2 in a structure in which mutual outputs are provided as inputs.

The first memory element MEM11 may be implemented as a volatile memory such as static random access memory (SRAM) or a dynamic random access memory (DRAM), or as a non-volatile memory such as ROM, flash memory, ReRAM, or MRAM.

Figure 12:
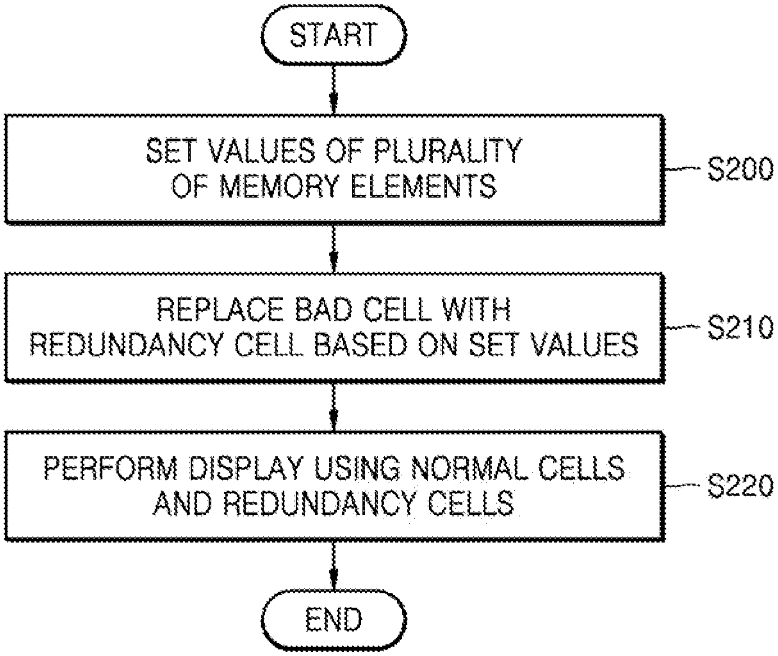
FIG. 12 is a flowchart illustrating an operation method of a display device according to an example embodiment.

FIG. 12 is a flowchart illustrating an operation method of a display device according to an example embodiment.

Referring to FIG. 12, in operation S200, the display device may set (or store) values of a plurality of memory elements respectively corresponding to a plurality of cells in a cell matrix.

In operation 210, the display device may replace a bad cell in the cell matrix with a redundancy cell of a redundancy IC based on the values set in the plurality of memory elements.

In operation S220, the display device may perform display using normal cells in the cell matrix and redundancy cells of the redundancy IC.

Figure 13:
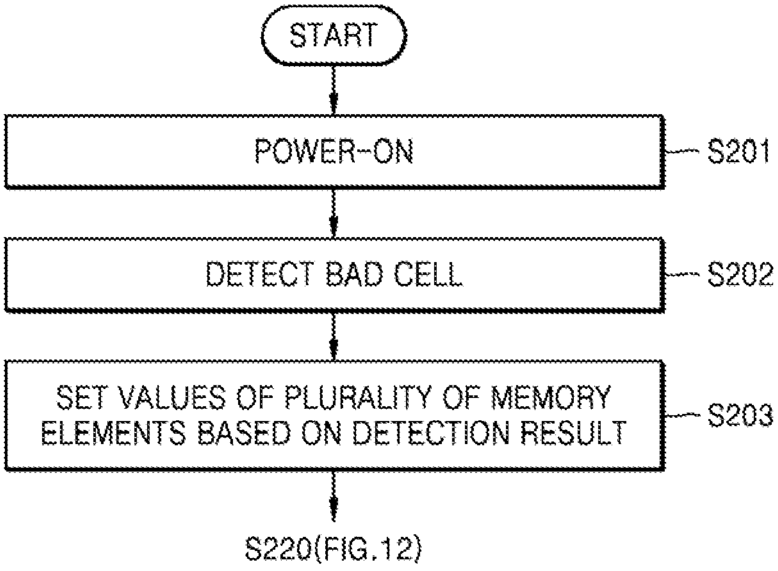
FIG. 13 is a flowchart illustrating an example of operation S200 of FIG. 12.

FIG. 13 is a flowchart illustrating an example of operation S200 of FIG. 12.

Referring to FIG. 13, in operation S201, the display device may be powered on.

In operation S202, the display device may detect a bad cell in the cell matrix after being powered on.

In operation S203, the display device may set (or store) the values of the plurality of memory elements respectively corresponding to the plurality of cells in the cell matrix based on a detection result.

Figure 14:
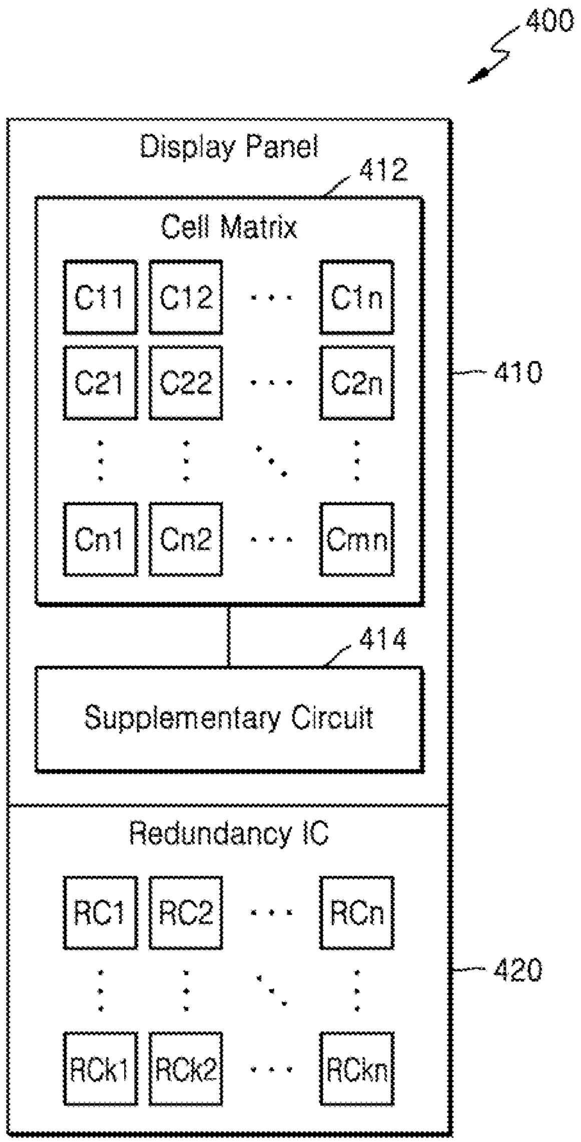
FIG. 14 is a block diagram of a display device according to an example embodiment.

FIG. 14 is a block diagram of a display device 400 according to an example embodiment.

Referring to FIG. 14, the display device 400 may include a display panel 410 and a redundancy IC 420.

The display panel 410 may include a cell matrix 412 and a supplementary circuit 414. The supplementary circuit 414 may be configured to improve characteristics of signals output from the redundancy IC 420 to the cell matrix 412. The supplementary circuit 414 may include, e.g., an amplifier for amplifying signals, a noise remover for removing noise, or the like.

The supplementary circuit 414 may be implemented by considering a distance between the cell matrix 412 and the redundancy IC 420. For example, the supplementary circuit 414 may provide a greater gain to a signal output from a redundancy cell that is far from a bad cell in the cell matrix 412, and may provide a lesser gain to a signal output from a redundancy cell that is close to the bad cell in the cell matrix 412.

Figure 15A:
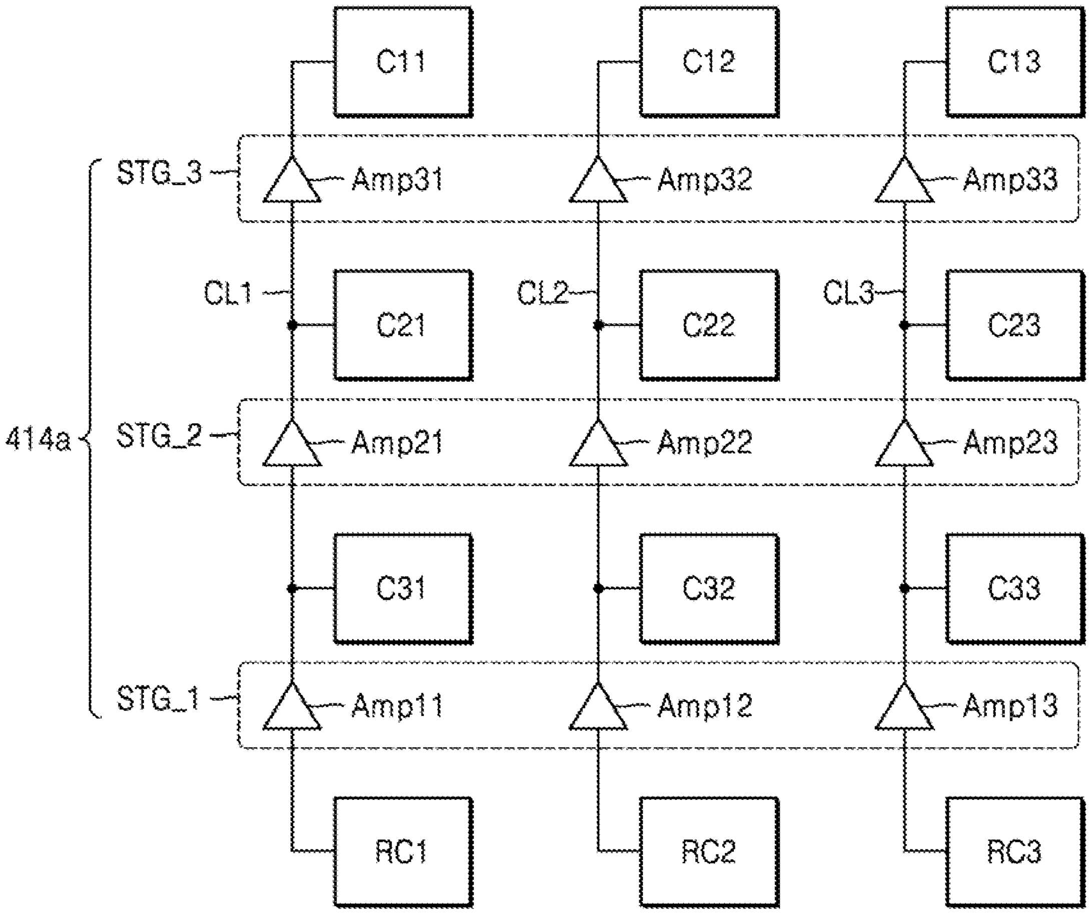
FIGS. 15A and 15B are diagrams respectively illustrating examples of a supplementary circuit of FIG. 14.
Figure 15B:
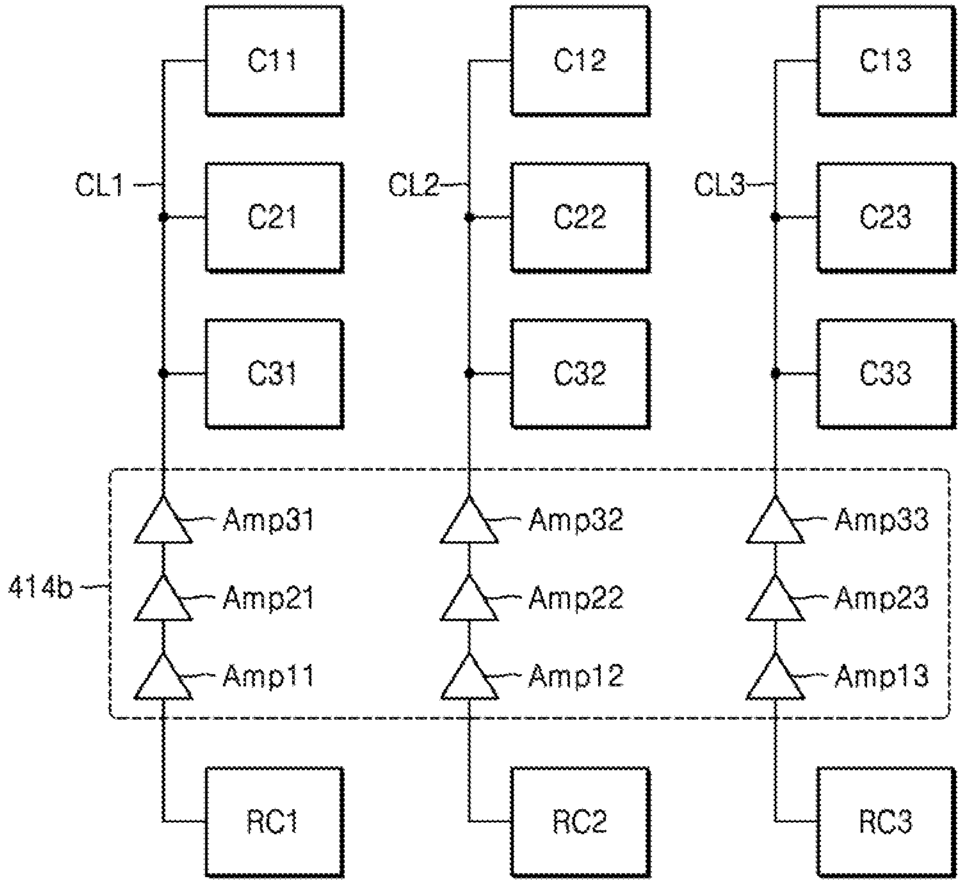

FIGS. 15A and 15B are diagrams respectively illustrating examples of the supplementary circuit of FIG. 14.

Referring to FIG. 15A, a supplementary circuit 414*a* may include first to third stages STG_1 to STG_3.

The first stage STG_1 may include first to third amplifiers Amp11, Amp12, and Amp13, and may be at a position between the first to third redundancy cells RC1 to RC3 and the seventh to ninth cells C31 to C33. The first to third amplifiers Amp11, Amp12, and Amp13 may be respectively formed on the first to third connection lines CL1 to CL3.

The second stage STG 2 may include fourth to sixth amplifiers Amp21 to Amp23, and may be at a position between the fourth to sixth cells C21 to C23 and the seventh to ninth cells C31 to C33. The fourth to sixth amplifiers Amp21 to Amp23 may be respectively formed on the first to third connection lines CL1 to CL3.

The third stage STG_3 may include seventh to ninth amplifiers Amp31 to Amp33, and may be at a position between the first to third cells C11 to C13 and the fourth to sixth cells C21 to C23. The seventh to ninth amplifiers Amp31 to Amp33 may be respectively formed on the first to third connection lines CL1 to CL3.

Referring to FIG. 15B, a supplementary circuit 414*b* may include the first to ninth amplifiers Amp11 to Amp33, and may be at a position between the first to third redundancy cells RC1 to RC3 and the seventh to ninth cells C31 to C33. The first to ninth amplifiers Amp11 to Amp33 may be respectively formed on the first to third connection lines CL1 to CL3.

The supplementary circuits 414*a* and 414*b* of FIGS. 15A and 15B are merely examples, and various examples for improving the characteristics of signals output from a redundancy IC to a cell matrix may be applied to a supplementary circuit.

Figure 16:
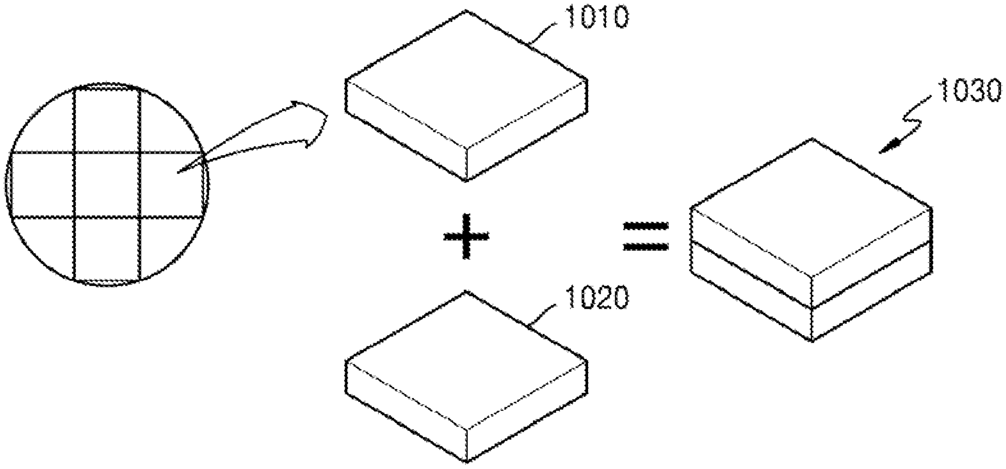
FIG. 16 is a schematic diagram illustrating an operation of manufacturing a display device according to an example embodiment.

FIG. 16 is a schematic diagram illustrating an operation of manufacturing a display device 1030 according to an example embodiment.

Referring to FIG. 16, the display device 1030 may include a light emitting element array 1010 and a driving circuit substrate 1020. The light emitting element array 1010 may be coupled to the driving circuit substrate 1020.

The light emitting element array 1010 may include a plurality of light emitting elements. Each of the plurality of light emitting elements may be a light emitting diode (LED). The light emitting element may be an LED having a micro to nano unit size. At least one light emitting element array 1010 may be manufactured by growing the plurality of light emitting elements on a silicon wafer. Accordingly, the display device 1030 may be manufactured by coupling the light emitting element array 1010 to the driving circuit substrate 1020 without individually transferring the light emitting element to the driving circuit substrate 1020.

Cells respectively corresponding to the plurality of light emitting elements on the light emitting element array 1010 may be arranged on the driving circuit substrate 1020 in a matrix form. The plurality of light emitting elements on the light emitting element array 1010 and a control circuit of the driving circuit substrate 1020 may be electrically connected to form a cell.

A redundancy IC, e.g., as described above with reference to FIG. 1, may be formed on a substrate different from the driving circuit substrate 1020 and the light emitting element array 1010 to be included in the display device 1030.

The driving circuit substrate 1020 may include control circuits included in the cells, and the control circuits may be implemented to be replaceable with control circuits of redundancy cells of the redundancy IC. Detailed descriptions thereof are already given above.

By way of summation and review, attention to display devices using micro light emitting diodes (μLEDs) is increasing. The development of micro LEDs on silicon or active matrix organic light emitting diodes (AMOLED) on silicon may improve characteristics of display devices, e.g., for virtual reality (VR), augmented reality (AR), and mixed reality (mixed reality) technologies. Minimizing a cell size may help to implement an image having a high resolution.

As described above, embodiments relate to a display device including a cell matrix. Embodiments may provide a display device in which a bad cell may be effectively replaced with a redundancy cell, to thus output a high-quality image without defects.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
a cell matrix including a first cell line and a second cell line, wherein the first cell line includes first cells sharing first row lines, and the second cell line includes second cells sharing second row lines;
a redundancy integrated circuit including a redundancy cell line including redundancy cells, wherein the redundancy cells share a third row line and are connected to the first and second cells through a plurality of column lines and a plurality of connection lines;
a display driver integrated circuit (DDI) configured to replace the first cell line or the second cell line with the redundancy cell line through the first row lines, the second row lines, and the third row line based on whether the first and second cell lines include a bad cell of the cell matrix; and
a memory configured to store bad cell-related information associated with the bad cell and output a replacement selection signal, the replacement selection signal identifying the bad cell of the cell matrix.

2. The display device as claimed in claim 1, wherein, when the first cells include at least one bad cell, the first cell line is replaced with the redundancy cell line.

3. The display device as claimed in claim 2, wherein, when the first cell line is replaced with the redundancy cell line, the DDI is further configured to transmit a data clock to each of the first cells and each of the redundancy cells through one of the first row lines and the third row line in a first period, and transmit the data clock to the second cells through one of the second row lines in a second period.

4. The display device as claimed in claim 1, wherein, each of the first cells and the second cells include:
a first shifter configured to store first data received through one column line of the plurality of column lines based on a data clock, and to output the first data based on a pulse width modulation (PWM) clock, wherein the one column line is connected to the first shifter;
a multiplexer configured to selectively output one of the first data and second data received through one connection line of the plurality of connection lines based on a replacement selection signal, wherein the one connection line is connected to the multiplexer; and
a light emitting element configured to emit light based on an output of the multiplexer.

5. The display device as claimed in claim 4, wherein each of the redundancy cells includes a second shifter configured to store second data based on the data clock, and to output the second data through one connection line of the plurality of connection lines based on the PWM clock, wherein the one connection line is connected to the second shifter.

6. The display device as claimed in claim 4, wherein:
the first and second row lines each include:
a first line configured to transmit the data clock or the PWM clock; and
a second line configured to transmit the replacement selection signal, and
the third row line includes a third line configured to transmit the data clock or the PWM clock.

7. The display device as claimed in claim 1, further comprising a control logic configured to control the DDI based on the bad cell-related information and the replacement selection signal.

8. The display device as claimed in claim 7, wherein the memory is a non-volatile memory.

9. A display device, comprising:
a cell matrix including first cells configured to share first row lines, first memory elements respectively corresponding to the first cells, second cells configured to share second row lines, and second memory elements respectively corresponding to the second cells; and
a redundancy integrated circuit including redundancy cells, wherein the redundancy cells are configured to share a third row line and are connected to the first and second cells through a plurality of column lines and a plurality of connection lines, wherein:
each of the first cells is configured to be selectively replaced with one redundancy cell of the redundancy cells connected thereto based on a first value representing a first replacement selection signal stored in a connected first memory element of the first memory elements, and
each of the second cells is configured to be selectively replaced with one redundancy cell of the redundancy cells connected thereto based on a second value representing a second replacement selection signal stored in a connected second memory element of the second memory elements.

10. The display device as claimed in claim 9, wherein each of the first cells and the second cells include:
a first shifter configured to store first data received through one column line of the plurality of column lines based on a data clock, and to output the first data based on a pulse width modulation (PWM) clock, wherein the one column line is connected to the first shifter;
a multiplexer configured to selectively output one of the first data and second data based on the replacement selection signal received from a corresponding memory element of the first and second memory elements, wherein the corresponding memory element is connected to the multiplexer, the second data is received from one connection line of the plurality of connection lines, and the one connection line is connected to the multiplexer; and
a light emitting element configured to emit light in response to an output of the multiplexer.

11. The display device as claimed in claim 10, wherein each of the redundancy cells includes a second shifter configured to store the second data received through the one column line based on the data clock, and to output the second data through the one connection line based on the PWM clock, wherein the one column line is connected to the second shifter, and the one connection line is connected to the second shifter.

12. The display device as claimed in claim 9, wherein:
the first memory elements are configured to share a first memory row line, and are respectively connected to a plurality of memory column lines, and the second memory elements are configured to share a second memory row line, and are respectively connected to the plurality of memory column lines.

13. The display device as claimed in claim 12, wherein the first and second memory elements are each configured to receive a memory enable signal from the first memory row line or the second memory row line connected thereto, to receive a memory setting signal from one memory column line connected thereto of the plurality of memory column lines, and to store a third value indicating whether one of the first cells or one of the second cells connected thereto is a bad cell.

14. The display device as claimed in claim 9, further comprising a display driver integrated circuit (DDI) configured to transmit a plurality of driving signals to the cell matrix and the redundancy integrated circuit through the first row lines, the second row lines, and the third row line.

15. The display device as claimed in claim 14, wherein the DDI is further configured to store certain values of the first and second memory elements in a memory setting period before transmitting the plurality of driving signals.

16. The display device as claimed in claim 15, further comprising a control logic, wherein:

the control logic is configured to control an overall operation of the DDI, and the control logic is further configured to control the DDI to detect a bad cell in the cell matrix and determine the certain values based on a detection result.

17. A display device, comprising:

a cell matrix including a first cell; and a redundancy integrated circuit including a first redundancy cell connected to the first cell through a first connection line, wherein:

the first redundancy cell includes a first shifter configured to store and output first data, and the first cell includes:

a second shifter configured to store and output second data;

a first multiplexer configured to select and output one of the first data received from the first shifter through the first connection line and the second data based on a first replacement selection signal;

a logic gate configured to output an output signal of the first multiplexer based on an output enable signal; and a light emitting element configured to emit light in response to the output signal of the first multiplexer received from the logic gate.

18. The display device as claimed in claim 17, further comprising a display driver integrated circuit (DDI), wherein:

the DDI is configured to drive the cell matrix and the redundancy integrated circuit, and the DDI is further configured to transmit the output enable signal and the first replacement selection signal to the first cell.

19. The display device as claimed in claim 17, wherein:

the first cell further includes a memory element, the memory element is configured to store a value indicating whether the first cell is a bad cell, and the memory element is further configured to transmit the value to the first multiplexer as the first replacement selection signal.

20. The display device as claimed in claim 19, further comprising a display driver integrated circuit (DDI), wherein:

the DDI is configured to drive the cell matrix and the redundancy integrated circuit, and the DDI is further configured to store the value in the memory element through a first memory row line and a first memory column line connected to the memory element.

* * * * *